UNITED STATES PATENT OFFICE.

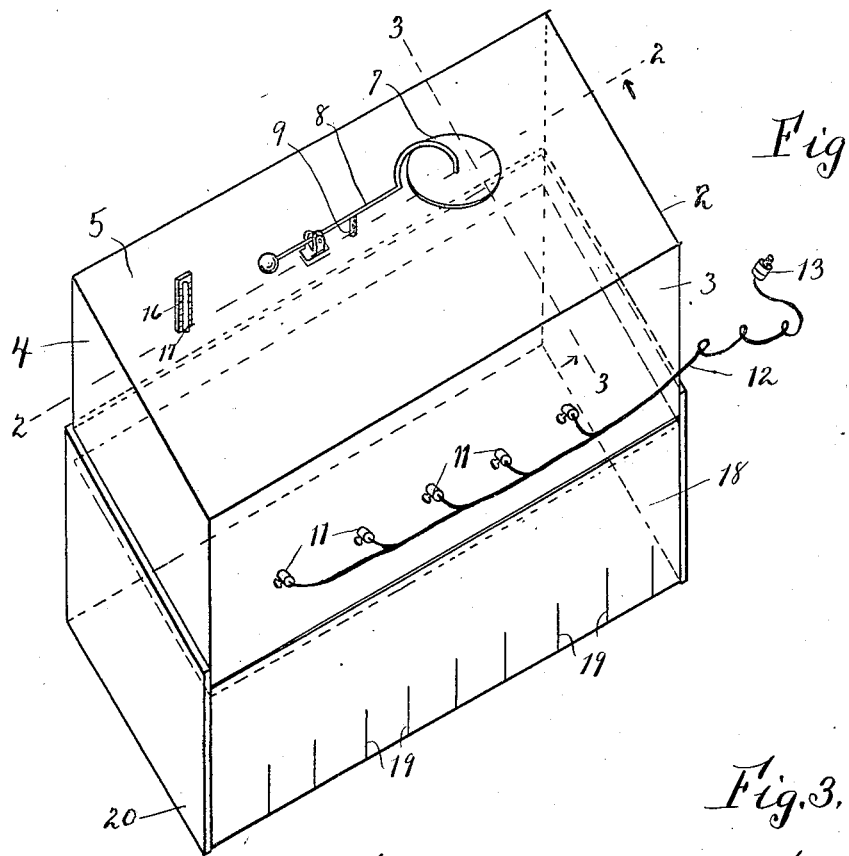
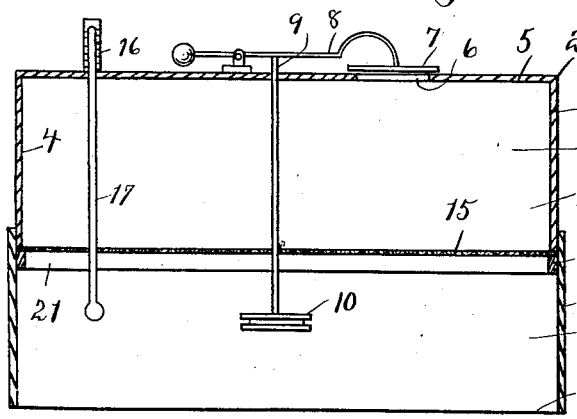
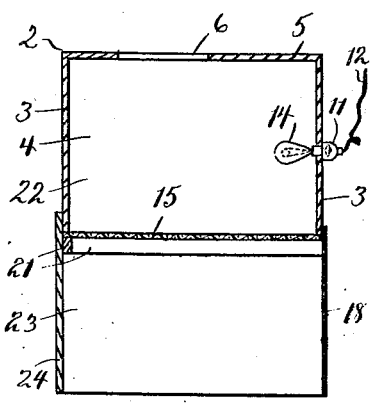

WILLIAM E. LANGSHAW, OF OLNEY, PENNSYLVANIA.

ELECTRIC BROODER.

1,172,372.  Specification of Letters Patent. Patented Feb. 22, 1916.

Application filed March 3, 1915. Serial No. 11,784.

*To all whom it may concern:*

Be it known that I, WILLIAM E. LANGSHAW, a citizen of the United States, residing at Olney, in the county of Philadelphia, State of Pennsylvania, have invented new and useful Improvements in Electric Brooders, of which the following is a specification.

My invention relates to new and useful improvements in electric brooders, and has for its object to provide an exceedingly simple and effective device of this character which may be heated by the ordinary electric bulbs, so arranged that the heat will pass into the hover for keeping the latter at the proper temperature to protect the poultry from the cold.

A further object of the invention is to provide a brooder which may be supported by a suitable hover in which is situated a thermostat, whereby the temperature may be regulated.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numeral to the accompanying drawing forming a part of this specification, in which—

Figure 1, is a perspective view of my improved electric brooder showing it supported by a suitable hover. Fig. 2, is a section at the line 2—2 of Fig. 1; and Fig. 3, is a section at the line 3—3 of Fig. 1.

In carrying out my invention as here embodied 2 represents the housing of the brooder comprising the side walls 3, end walls 4 and top 5, the latter having a draft opening 6 therein, which is normally covered by the damper 7 supported by the arm 8 which carries a rod 9 passing entirely through the housing of the brooder to the lower end of which is connected the thermostat 10. In one of the side walls 3 are mounted a number of supports 11 connected by the wires 12 with the plug 13, whereby connection is made with a source of electric current.

In each of the supports is placed an electric light bulb 14 preferably formed of dark glass in order to partially shut out the rays of light. Over the lower or open end of the housing is placed a suitable textile fabric 15 preferably black in color, in order to further shut out the rays of light from poultry. On top of the housing is also mounted a thermometer 16, the tube 17 of which passes through the housing and extends some distance below the textile fabric 15. To the lower edge of one of the side walls of the housing is secured a curtain 18 having its lower edge split at a number of points as at 19 to permit the poultry to readily pass in and out through said curtain.

The brooder is supported in any suitable manner preferably upon a pen or hover constructed from a number of boards to form a back 24 and ends 20, said back and ends having cleats 21 secured thereto adjacent their upper edges forming a rest for the lower edges of the brooder housing, and as will be readily understood the front of the hover is formed by the curtain 18.

In practice the heat thrown off by the electric light bulbs will raise the temperature in the brooder compartment 22 and because of the relatively thin textile fabric 15 between the brooder compartment and the hover compartment 23 the temperature in said hover compartment will also be raised sufficiently to protect the poultry therein from the cold.

The temperature in the compartments will be regulated by the damper 7, which is actuated by the thermostat 10, the latter situated within the hover compartment a sufficient distance from the ground to permit the poultry to readily pass thereunder.

I have herein described one means of regulating the temperature within the compartments by the use of a rheostat, which is illustrated as operating a damper, but of course it will be understood that the rheostat might be so constructed as to regulate the temperature by regulating the current passing to the electric light bulbs.

Of course I do not wish to be limited to the exact details of construction as here shown as these may be varied within the limits of the appended claims without departing from the spirit of my invention.

Having thus fully described my invention, what I claim as new and useful, is—

1. In a device of the character stated a housing consisting of a top having a flue opening therein, end walls and side walls, a textile fabric arranged over the lower or open side of the housing, sockets mounted in one of the side walls of the housing, electric light bulbs mounted in said sockets, a damper for normally closing the flue, a thermostat situated below the textile fabric for actuating said damper, a hover for supporting the housing comprising a back, end pieces, and cleats secured to said back and end pieces, said cleats forming the rest for the housing and a hover curtain secured to the edge of one of the side walls of the housing and depending therefrom to cover the open side of the hover.

2. In a device of the character stated a housing consisting of a top, end walls and side walls, a textile fabric arranged over the lower or open side of the housing, sockets mounted in one of the side walls of the housing, electric light bulbs mounted in said sockets, a hover for supporting the housing comprising a back, end pieces and cleats secured to said back and end pieces, said cleats forming the rest for the housing, a hover curtain secured to the edge of one of the side walls of the housing and depending therefrom to cover the open side of the hover and means within the hover for regulating or controlling the temperature of the compartments.

In testimony whereof, I have hereunto affixed my signature in the presence of two subscribing witnesses.

WILLIAM E. LANGSHAW.

Witnesses:
 ARTHUR S. MINSTER,
 CHAS. L. GUERIN.